US009094855B2

(12) United States Patent
Etemad et al.

(10) Patent No.: US 9,094,855 B2
(45) Date of Patent: Jul. 28, 2015

(54) MEASUREMENT OF NODES IN COORDINATED MULTIPOINT (COMP) SYSTEMS

(71) Applicant: Intel Corporation, Santa Clara, CA (US)

(72) Inventors: Kamran Etemad, Potomac, MD (US); Alexei Davydov, Nizhny Novgorod (RU); Yujian Zhang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 181 days.

(21) Appl. No.: 13/853,398

(22) Filed: Mar. 29, 2013

(65) Prior Publication Data
US 2013/0322273 A1 Dec. 5, 2013

Related U.S. Application Data

(60) Provisional application No. 61/653,369, filed on May 30, 2012.

(51) Int. Cl.
*H04L 12/26* (2006.01)
*H04W 28/02* (2009.01)
*H04W 24/10* (2009.01)
*H04N 21/24* (2011.01)
(Continued)

(52) U.S. Cl.
CPC .......... *H04W 28/0289* (2013.01); *H04N 21/24* (2013.01); *H04W 24/10* (2013.01); *H04W 28/10* (2013.01); *H04W 36/22* (2013.01); *H04W 36/04* (2013.01)

(58) Field of Classification Search
None
See application file for complete search history.

(56) References Cited

U.S. PATENT DOCUMENTS

2010/0238821 A1   9/2010   Liu et al.
2010/0323720 A1* 12/2010   Jen ............................. 455/456.1
(Continued)

FOREIGN PATENT DOCUMENTS

WO   2012061982 A1   5/2012
WO   2012064085 A2   5/2012

OTHER PUBLICATIONS

International Search Report and Written Opinion received for PCT Patent Application No. PCT/US2013/041301, mailed on Aug. 23, 2013, 11 pages.

(Continued)

*Primary Examiner* — Afshawn Towfighi
(74) *Attorney, Agent, or Firm* — Thorpe North & Western LLP

(57) ABSTRACT

Technology for enabling radio resource management (RRM) measurements in coordinated multi-point (CoMP) transmission and reception is disclosed. One method comprises sending, from an evolved node B (eNB) to a user equipment (UE), an information element (IE) containing a list of measurement objects that define configurations of channel state information reference signal (CSI-RS) based RRM measurements. The eNB can analyze the CSI-RS based RRM measurements in a CoMP Resource Management (CRM) Set, wherein each CSI-RS based RRM measurement corresponds to a transmission point in a set of transmission points which may be used for downlink transmissions to the UE. The eNB can select a CoMP Measurement Set based on the CSI-RS based RRM measurements reported by the UE, comprising at least one of the set of transmission points for which fast channel state information (CSI) feedback will be reported to the eNB from the UE.

21 Claims, 14 Drawing Sheets

(51) Int. Cl.
*H04W 36/22* (2009.01)
*H04W 28/10* (2009.01)
*H04W 36/04* (2009.01)

(56) References Cited

U.S. PATENT DOCUMENTS

2011/0199986 A1* 8/2011 Fong et al. .................... 370/329
2012/0051257 A1 3/2012 Kim et al.
2012/0190375 A1* 7/2012 Gu et al. ....................... 455/450
2012/0281554 A1* 11/2012 Gao et al. ..................... 370/252

OTHER PUBLICATIONS

CSI-RS based measurement for CoMP, 3GPP TSG-RAN WG1 #66bis, See sections 1,2 and figure 1., 3 pages, Oct. 2011.

* cited by examiner

Illustration of A3 Event for CSI-RS Based RRM Measurements and Reporting 5.5.2.5    Measurement object addition/ modification The UE shall:
  1> for each *measObjectId* included in the received
    *measObjectToAddModList*:
    2> if an entry with the matching *measObjectId* exists in the
      *measObjectList* within the *VarMeasConfig*, for this entry:

3> if the received *measObject* includes the *csi-RS-ToRemoveList*:

4> for each *csi-RS-Index* included in the *csi-RS-ToRemoveList*:

5> remove the entry with the matching *CSI-RSIndex* from the
            *csi-RS-ToAddModList*;

3> if the received *measObject* includes the *csi-RS-ToAddModList*:

4> for each *csi-RS-Index* value included in the *csi-RS-*
          *ToAddModList*:

5> if an entry with the matching *csi-RS-Index* exists in the
            *csi-RS-ToAddModList*:

6> replace the entry with the value received for this *csi-*
              *RS-Index*;

5> else:

6> add a new entry for the received *csi-RS-Index* to the
              *csi-RS-ToAddModList*;

FIG. 6

```
-- ASN1START

MeasObjectToAddModList ::=          SEQUENCE (SIZE (1..maxObjectId)) OF
MeasObjectToAddMod MeasObjectToAddMod ::= SEQUENCE {
    measObjectId                    MeasObjectId,
    measObject                      CHOICE {
        measObjectEUTRA                 MeasObjectEUTRA,
        measObjectUTRA                  MeasObjectUTRA,
        measObjectGERAN                 MeasObjectGERAN,
        measObjectCDMA2000              MeasObjectCDMA2000,
        ...,
        measObjectEUTRA-CSI-RS          MeasObjectEUTRA-CSI-RS OPTIONAL     --
Need ON

}
}

-- ASN1STOP
```

```
-- ASN1START

MeasObjectEUTRA-CSI-RS ::=      SEQUENCE {
    carrierFreq                 ARFCN-ValueEUTRA,
    allowedMeasBandwidth        AllowedMeasBandwidth,
    -- CSI-RS list
    csi-RS-ToRemoveList         CellIndexList               OPTIONAL,   -- Need ON
    csi-RS-ToAddModList         CSI-RS-ToAddModList         OPTIONAL,   -- Need ON
    ...,
    [[measCycleSCell-r10        MeasCycleSCell-r10          OPTIONAL,   -- Need ON
      measSubframePatternConfigNeigh-r10
      MeasSubframePatternConfigNeigh-r10 OPTIONAL                       -- Need ON
    ]]
}
```

FIG. 8B

```
-- ASN1START

CSI-RS-ToAddModList ::=         SEQUENCE (SIZE (1..maxCellMeas))
                                OF CSI-RS-ToAddMod CSI-RS-ToAddMod::= SEQUENCE {
    csi-RS-Index                INTEGER (1..maxCellMeas),
    antennaPortsCount               AntennaPortsCount,
    resourceConfig                  ResourceCofig,
    subframeConfig                  SubframeConfig,
    ScramblingInitializationParameter   ScramblingInitializationParameter csi-RS-Bandwidth                CSI-RS-Bandwidth
    csi-RS-IndividualOffset         Q-OffsetRange
}
```

FIG. 8C

```
MeasObjectEUTRA ::=            SEQUENCE {
    carrierFreq                ARFCN-ValueEUTRA,
    allowedMeasBandwidth       AllowedMeasBandwidth,
    presenceAntennaPort1       PresenceAntennaPort1,
    neighCellConfig            NeighCellConfig,
    offsetFreq                 Q-OffsetRange              DEFAULT dB0,
    -- Cell list
    cellsToRemoveList          CellIndexList              OPTIONAL,    -- Need ON
    cellsToAddModList          CellsToAddModList          OPTIONAL,    -- Need ON
    -- Black list
    blackCellsToRemoveList     CellIndexList              OPTIONAL,    -- Need ON
    blackCellsToAddModList     BlackCellsToAddModList     OPTIONAL,    -- Need ON
    cellForWhichToReportCGI    PhysCellId                 OPTIONAL,    -- Need ON
    ...,
    [[measCycleSCell-r10       MeasCycleSCell-r10         OPTIONAL,    -- Need ON
       measSubframePatternConfigNeigh-r10
                               MeasSubframePatternConfigNeigh-r10
                                                          OPTIONAL     -- Need ON
    ]],
    [[csi-RS-ToRemoveList      CellIndexList              OPTIONAL,    -- Need ON
    csi-RS-ToAddModList        CSI-RS-ToAddModList        OPTIONAL,    -- Need ON
    ]]
}
```

MEASUREMENT OF NODES IN COORDINATED MULTIPOINT (COMP) SYSTEMS

RELATED APPLICATIONS

This application claims the benefit of and hereby incorporates by reference U.S. Provisional Patent Application Ser. No. 61/653,369, filed May 30, 2012.

BACKGROUND

Wireless mobile communication technology uses various standards and protocols to transmit data between a node (e.g., transmission station) and a wireless device. Some wireless devices communicate using orthogonal frequency-division multiplexing (OFDM) combined with a desired digital modulation scheme via a physical layer. For example, the third generation partnership project long term evolution (3GPP LTE) standard uses OFDM. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device (e.g., mobile device), known as a user equipment (UE). A downlink (DL) transmission can be a communication from the node station (or eNodeB) to the wireless device (or UE), and an uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) are used to handle the increased traffic loads on the macro nodes due to increased usage and functionality of wireless devices. HetNets can include a layer of planned high power macro nodes (or macro-eNBs) overlaid with layers of lower power nodes (micro-eNBs, pico-eNBs, femto-eNBs, or home eNBs) that can be deployed in a less well planned or even entirely uncoordinated manner within the coverage area (cell) of a macro node. The lower power nodes (LPNs) can generally be referred to as "low power nodes". The macro node can be used for basic coverage, and the low power nodes can be used to fill coverage holes, to improve capacity in hot-zones or at the boundaries between the macro nodes' coverage areas, and improve indoor coverage where building structures impede signal transmission.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 illustrates an amended procedure in the Third Generation Partnership Project (3GPP) Radio Resource Connection (RRC) Technical Specification (TS) 36.331 for the addition and modification of a channel state information reference signal (CSI-RS) measurement object in accordance with an example;

FIGS. 8A-8D illustrate ASN.1 code examples of enabling the addition and modification of a channel state information reference signal (CSI-RS) measurement object as provided by an evolved universal terrestrial radio access network (E-UTRAN) in accordance with an example;

Figure 1A:
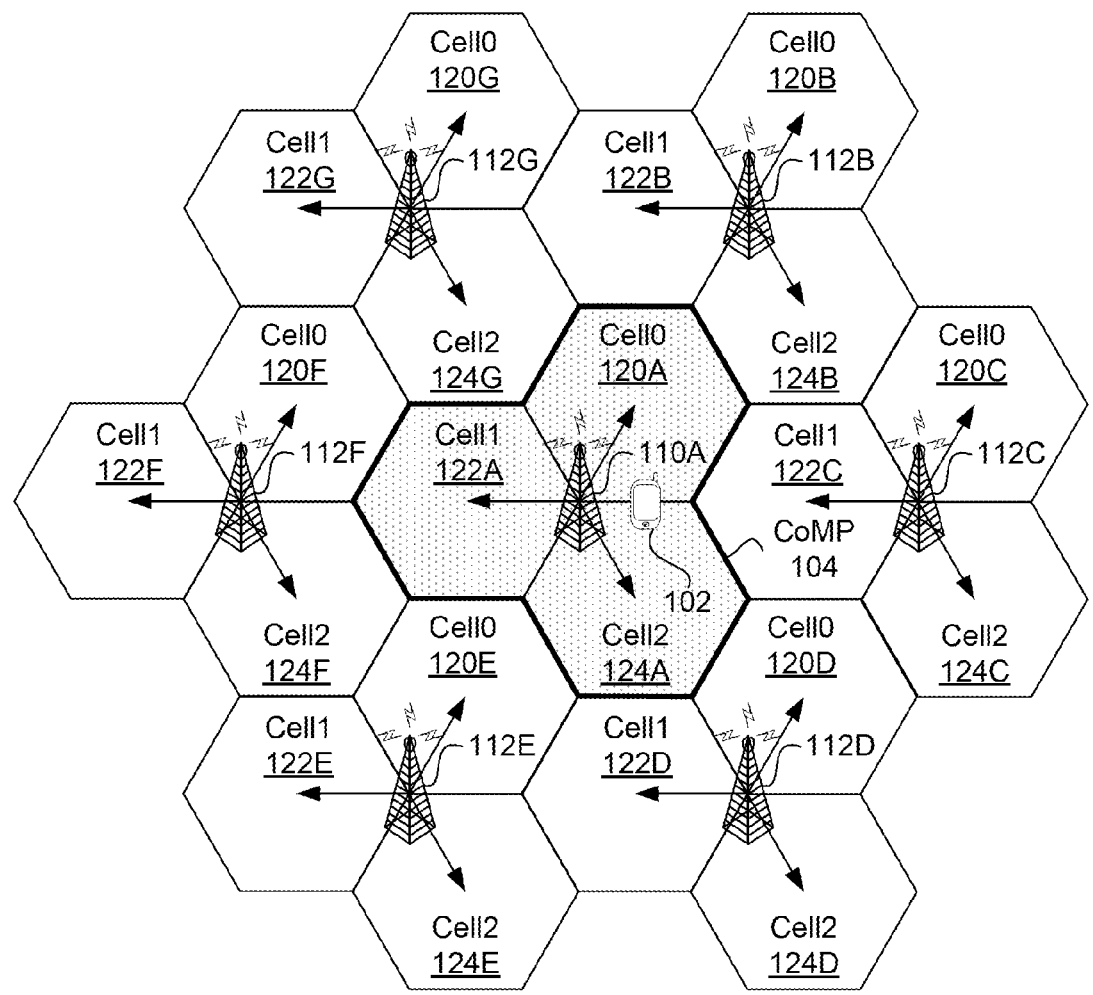
FIG. 1A illustrates a diagram of a homogenous network using an intra-site coordinated multipoint (CoMP) system (e.g., CoMP scenario 1) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A Coordinated MultiPoint (CoMP) system may use a range of different techniques that enable the dynamic coordination of transmission and reception between a plurality of geographically-separated base stations in a network. The CoMP system can coordinate and combine signals from multiple antennas to increase UE performance (e.g., by achieving higher and more consistent data rates). In CoMP, when a UE is in a cell-edge region (i.e., the outer region of a cell), the UE may receive signals from a plurality of nodes. Thus, coordinating the downlink signals from the plurality of nodes to the UE may increase downlink (DL) performance. In addition, the UE may transmit signals to the plurality of nodes in the uplink (UL). Since the signal from the UE can be received at the plurality of nodes, coordinating the reception between the plurality of nodes may improve UL performance.

The network can be a wireless wide area network (WWAN) or wireless local area network (WLAN) based on a selected radio access network (RAN) technology. The WWAN can be configured to operate based on a cellular networking standard such as IEEE 802.16 standard, commonly referred to as WiMAX (worldwide interoperability for microwave access), and the third generation partnership project (3GPP). Releases of the IEEE 802.16 standard include the IEEE 802.16e-2005, 802.16-2009, and 802.16m-2011. Releases of the 3GPP standard include the 3GPP LTE, Release 8 in the fourth quarter of 2008, 3GPP LTE Advanced Release 10 in the first quarter of 2011, and 3GPP LTE Release 11 in the third quarter of 2012.

Standards such as WiFi or Bluetooth are used to provide wireless local area networks (WLAN). WiFi is a common name provided to an Institute of Electronics and Electrical Engineers (IEEE) 802.11 set of standards for communicating in unlicensed spectrum including the 2.4, 3.7 and 5 GHz frequency bands. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), and the 802.11n standard released in 2009 for communication in the 2.4 GHz and 5 GHz bands using multiple-input multiple-output (MIMO).

In addition, CoMP may be used to reduce interference from neighboring nodes in both homogeneous networks and HetNets. In the Coordinated MultiPoint (CoMP) system, the nodes, referred to as cooperating nodes, can also be grouped together with other nodes where the nodes from multiple cells can transmit signals to the wireless device and receive signals from the wireless device. The cooperating nodes can be nodes in the homogeneous network or macro nodes and/or lower power nodes (LPN) in the HetNet. Downlink CoMP transmission can be divided into two categories: coordinated scheduling or coordinated beamforming (CS/CB or CS/CBF), and joint processing or joint transmission (JP/JT). With CS/CB, a given subframe can be transmitted from one cell to a given wireless device (UE), and the scheduling, including coordinated beamforming, is dynamically coordinated between the cells in order to control and/or reduce the interference between different transmissions. For joint processing, joint transmission can be performed by multiple cells to a wireless device (UE), in which multiple nodes transmit at the same time using the same time and frequency radio resources and/or dynamic cell selection.

As will be described in further detail below, at least four basic scenarios can be used for CoMP operation. CoMP Scenario 4 is a configuration in which a node (e.g., an eNB) broadcasts the same cell identifier (ID) to a plurality of other nodes (e.g., remote radio heads). The nodes may include macro nodes, lower power nodes, remote radio heads (RRHs), and eNBs. For example, an eNB may broadcast its own cell ID to a plurality of surrounding nodes, thus resulting in all of the surrounding nodes having the same cell ID as the eNB.

In 3GPP, cell-specific reference signals (CRS) are generally used to perform radio resource management (RRM) measurements. For example, a UE may report CRS-based RRM measurements to the eNB. The eNB may use the CRS-based RRM measurements for making various decisions (e.g., identifying nodes for handover, identifying nodes for carrier aggregation). For example, after receiving the CRS-based RRM measurements from a plurality of nodes, the eNB may select a single node (i.e., a transmission point) to transmit data to a UE. In CoMP scenario four, the plurality of nodes may transmit the same CRS-based RRM measurement to the eNB because the nodes all contain the same cell ID. As a result, the CRS-based RRM measurements may be unreliable in CoMP scenario four because the CRS-based RRM measurements may actually be a combination of the CRS-based RRM measurements received, at the eNB, from the plurality of nodes.

In contrast, CRS-based RRM measurements may be useful in other CoMP scenarios (e.g., CoMP scenarios 1, 2 and 3) because the plurality of nodes each broadcast a unique cell ID. For example, if the CRS-based RRM measurement of node 1 has a greater Received Signal Strength Indicator (RSSI) or Reference Signal Received Power (RSRP) as compared to node 2, then the eNB may determine that node 1 is closer to the UE, rather than node 2. Therefore, the eNB can request that node 1 send data to the UE. However, when the plurality of nodes contain the same cell ID, and therefore transmit the same CRS-based RRM measurement to the eNB, the CRS-based RRM measurement may produce an aggregate measurement of the nodes rather than providing the eNB with the closest node for transmitting data. In other words, the eNB would be unable to determine whether node 1 or node 2 is closer to the UE.

In one embodiment, the plurality of nodes may use channel state information reference signals (CSI-RS) when performing RRM measurements. In particular, the nodes may use CSI-RS based RRM measurements in CoMP scenario four. The CSI-RS can be configured for each UE. As a result, a plurality of nodes (e.g., three nodes) would receive different CSI-RS based RRM measurements from a single UE. For example, if a UE sends CSI-RS based RRM measurements for nodes 1, 2, and 3 to the eNB, the measurements would be accurate even though the nodes broadcast the same cell ID. In other words, the CSI-RS based RRM measurements sent to the eNB for each node would not be a combination (i.e., aggregate) of the CSI-RS based RRM measurements for nodes 1, 2, and 3. The nodes 1, 2, and 3 may be remote radio heads associated with the eNB. Thus, the eNB would be able to determine which of nodes 1, 2, and 3 are most suitable (e.g., the closest) for sending data to the UE.

Therefore, having the UE perform the RRM measurements based on the CSI-RS, as opposed to the CRS, can be more suitable for CoMP scenario four because the CSI-RS does not depend on the cell ID and is configured per UE. In addition, CSI-RS based RRM measurements can include reference signal received power (RSRP) measurements, as well as reference signal received quality (RSRQ) measurements. For example, the eNB may use the CSI-RS based RRM measurements provided by ten nodes to determine, among the ten nodes, which node is being received with the highest RSRP on the UE.

FIG. 1A illustrates an example of a coordination area 104 (outlined with a bold line) of an intra-site CoMP system in a homogenous network, which can illustrate LTE CoMP scenario 1. Each node 110A and 112B-G can serve multiple cells (or sectors) 120A-G, 122A-G, and 124A-G. The cell can be a logical definition generated by the node or geographic transmission area or sub-area (within a total coverage area) covered by the node, which can include a specific cell identification (ID) that defines the parameters for the cell, such as control channels, reference signals, and component carriers (CC) frequencies. By coordinating transmission among multiple cells, interference from other cells can be reduced and the received power of the desired signal can be increased. The nodes outside the CoMP system can be non-cooperating nodes 112B-G. In an example, the CoMP system can be illustrated as a plurality of cooperating nodes (not shown) surrounded by a plurality of non-cooperating nodes.

Figure 1B:
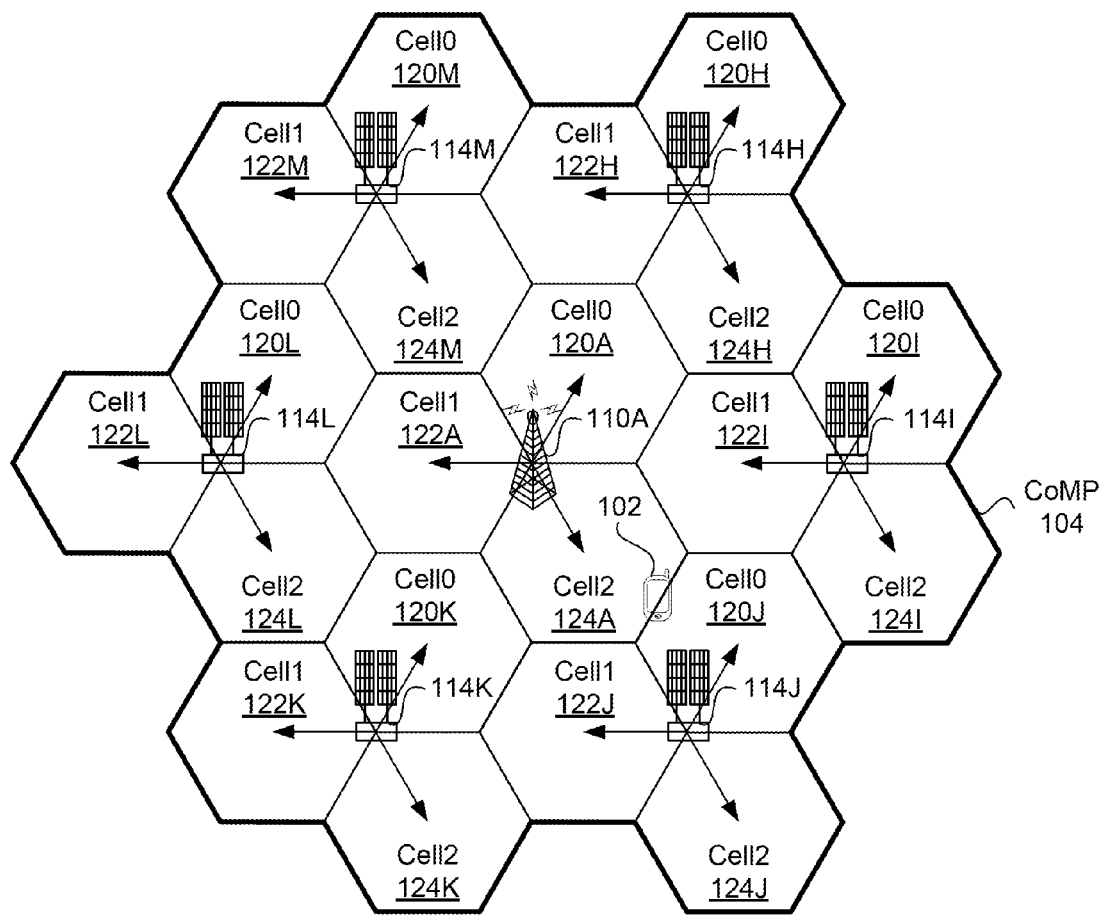
FIG. 1B illustrates a diagram of a homogenous network with high transmission power using an inter-site coordinated multipoint (CoMP) system (e.g., CoMP scenario 2) in accordance with an example.

FIG. 1B illustrates an example of an inter-site CoMP system with high power remote radio heads (RRHs) in a homogenous network, which can illustrate LTE CoMP scenario 2. A coordination area 104 (outlined with a bold line) can include eNBs 110A and RRHs 114H-M, where each RRH can be configured to communicate with the eNB via a backhaul link (optical or wired link). The cooperating nodes can include eNBs and RRHs. In a CoMP system, the nodes can be grouped together as cooperating nodes in adjacent cells, where the cooperating nodes from multiple cells can transmit signals to the wireless device 102 and receive signals from the wireless device. The cooperating nodes can coordinate transmission/reception of signals from/to the wireless device 102 (e.g., UE). The cooperating node of each CoMP system can be included in a coordinating set. A CSI report may be generated on a CSI process based on transmissions from each coordinating set.

Figure 1C:
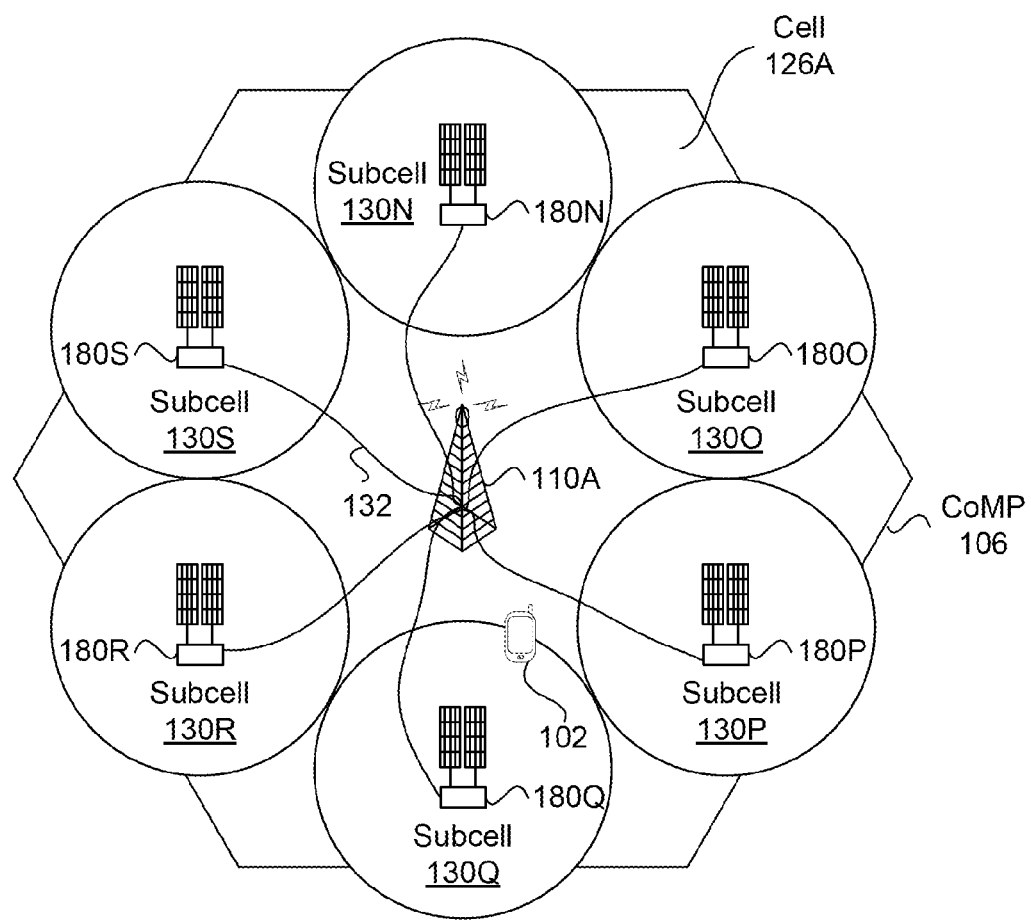
FIG. 1C illustrates a diagram of a coordinated multipoint (CoMP) system in a heterogeneous network with low power nodes (e.g., CoMP scenario 3 or 4) in accordance with an example.

FIG. 1C illustrates an example of a CoMP system with low power nodes (LPNs) in a macro cell coverage area. FIG. 71 can illustrate LTE CoMP scenarios 3 and 4. In the intra-site CoMP example illustrated in FIG. 1C, LPNs (or RRHs) of a macro node 110A may be located at different locations in space, and CoMP coordination may be within a single macrocell. A coordination area 104 can include eNBs 110A and LPNs 180N-S, where each LPN can be configured to communicate with the eNB via a backhaul link 132 (optical or wired link). A cell 126A of a macro node may be further sub-divided into sub-cells 130N-S. LPNs (or RRHs) 180N-S may transmit and receive signals for a sub-cell. A wireless device 102 can be on a sub-cell edge (or cell-edge) and intra-site CoMP coordination can occur between the LPNs (or RRHs) or between the eNB and the LPNs. In CoMP scenario 3, the low power RRHs providing transmission/reception points within the macrocell coverage area can have different cell IDs from the macro cell. In CoMP scenario 4, the low power RRHs providing transmission/reception points within the macrocell coverage area can have a same cell ID as the macro cell.

Downlink (DL) CoMP transmission can be divided into two categories: coordinated scheduling or coordinated beamforming (CS/CB or CS/CBF), and joint processing or joint transmission (JP/JT). With CS/CB, a given subframe can be transmitted from one cell to a given mobile communication device (UE), and the scheduling, including coordinated beamforming, is dynamically coordinated between the cells in order to control and/or reduce the interference between different transmissions. For joint processing, joint transmission can be performed by multiple cells to a mobile communication device (UE), in which multiple nodes transmit at the same time using the same time and frequency radio resources and dynamic cell selection. Two methods can be used for joint transmission: non-coherent transmission, which uses soft-combining reception of the OFDM signal; and coherent transmission, which performs precoding between cells for in-phase combining at the receiver. By coordinating and combining signals from multiple antennas, CoMP, allows mobile users to enjoy consistent performance and quality for high-bandwidth services whether the mobile user is close to the center of a cell or at the outer edges of the cell.

Figure 2:
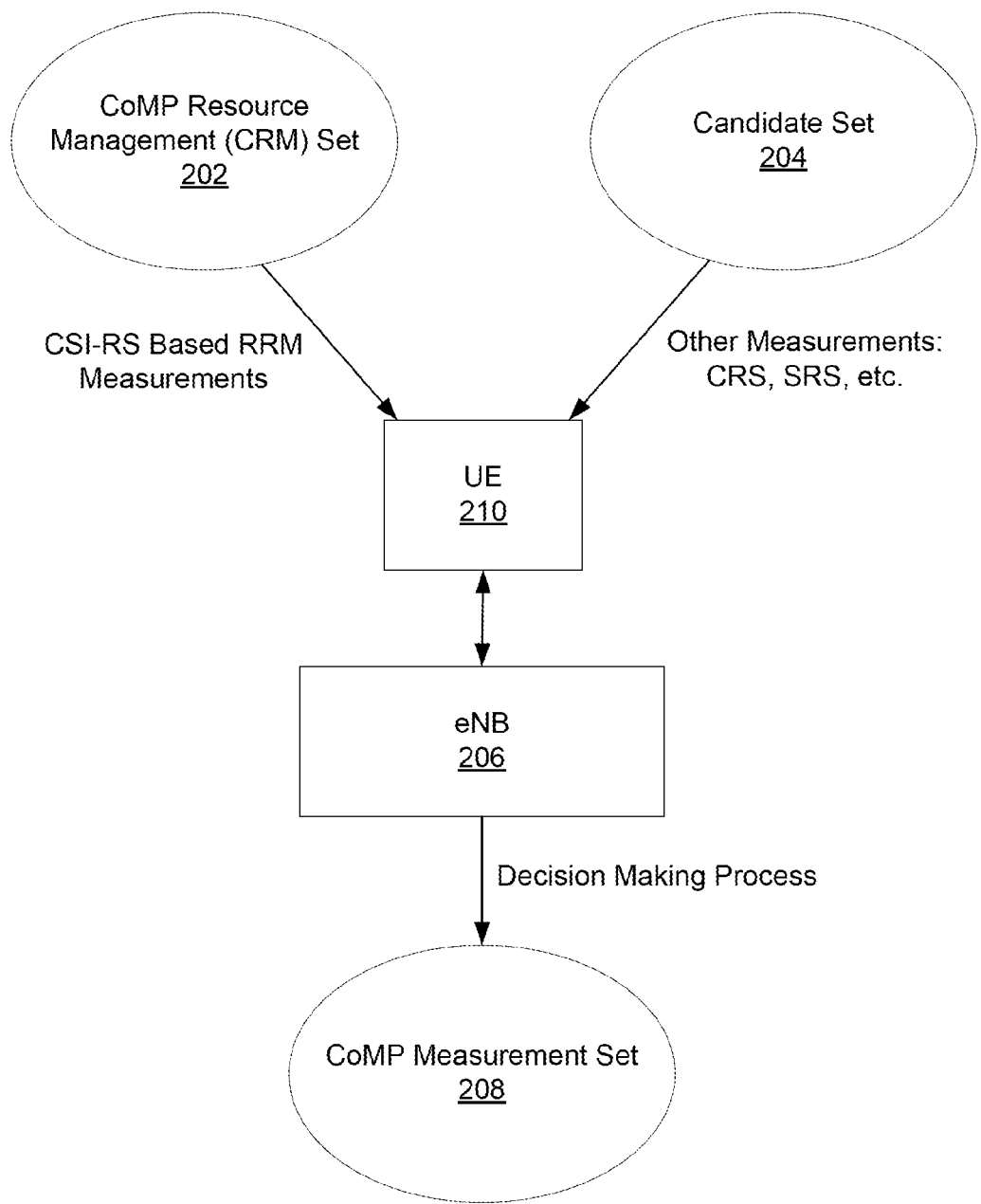
FIG. 2 illustrates a diagram of an evolved node B (eNB) determining a coordinated multipoint (CoMP) Set based on a CoMP Resource Management (CRM) Set and a candidate set in accordance with an example.

FIG. 2 illustrates a diagram 200 of an evolved node B (eNB) 206 determining a coordinated multipoint (CoMP) Measurement Set 208 based on a CoMP Resource Management (CRM) Set 202 and a set of other cell measurements 204. The CRM Set 202 may include a set of nodes (e.g., a set of remote radio heads) that are provided with CSI-RS based RRM measurements from the UE. Each node in the set of nodes may transmit downlink data to the UE. Each CSI-RS based RRM measurement may correspond with a transmission point (i.e., a node) which may transmit downlink data to a UE. In other words, the CRM Set 202 can be a set of channel state information reference signals (CSI-RSs) for which the UE is configured to provide RRM-type measurements to the eNB 206.

The CSI-RS based RRM measurements can include reference signal received power (RSRP) measurements and/or reference signal received quality (RSRQ) measurements. The RSRP measurement can provide a measurement of a signal strength of an LTE cell, and is the average of the power of all resource elements which carry cell-specific reference signals over the entire bandwidth. The RSRQ measurement gives a ratio between the RSRP and the Received Signal Strength Indicator (RSSI), and combines signal strength and interference.

The UE may perform the CSI-RS based RRM measurements, as designated by the CRM Set, and then report the measurements to the eNB 206. For example, the CRM Set 202 may include a set of five nodes (e.g., five remote radio heads) for which the UE reports CSI-RS based RRM measurements to the eNB 206. Based on the CSI-RS based measurements corresponding to each node, the eNB 206 may select one or more of the nodes to transmit data to the UE. In other words, the eNB 206 may learn that a particular node has a higher RSRP and/or RSRQ as compared to the other nodes in the CRM Set 202, and therefore, may select that node to communicate with the UE.

The UE may perform the CSI-RS based RRM measurements for a plurality of nodes. The measurement s made by the UE can be configured using a CSI-RS-Config information element (IE) received from the eNB. The UE can receive the IE from the eNB through radio resource control (RRC) signaling. The IE can provide the configuration of CSI-RS based RRM measurement objects. For example, the IE can include the addition, removal, and/or replacement of CSI-RS resources. The UE can perform the CSI-RS based RRM measurements for the CSI-RS resources included in the IE. As a result, the IE can effectively identify specific nodes (based on the CSI-RS resources) for which the UE is to perform CSI-RS based RRM measurements. The UE can then report the CSI-RS based RRM measurements to the eNB.

In one embodiment, the eNB 206 may identify nodes in a candidate set 204 in order to determine a most suitable node (e.g., a closest node) for transmitting data to the UE. The nodes in the candidate set 204 can be measured using measurement techniques other than CSI-RS based RRM measurements. The measurements of the nodes in the candidate set 204 can be reported, by the UE, to the eNB 206. The measurement techniques can include cell-specific reference signal (CRS) based RRM measurements, sounding reference signal (SRS) measurements, and physical uplink control channel (PUCCH) measurements. The SRS and the PUCCH measurements can be periodically received, at the eNB, from the UE. Therefore, the eNB 206 may use information other than CSI-RS based RRM measurements to determine nodes (i.e., transmission points) that can be used for CoMP. The nodes in the candidate set 204 may be exclusive (i.e., different from) the nodes in the CRM Set 202. In addition, the nodes in the candidate set 204 may contain one or more nodes from in the CRM Set 202, but the nodes in the candidate set 204 may be measured differently (e.g., using CRS or SRS).

In one configuration, the eNB 206 may utilize both the CRM Set 202 containing the CSI-RS based RRM measurements and the candidate set 204 containing the non CSI-RS based RRM measurements in order to determine a CoMP Measurement Set 208. Based on the measurements received from a UE for nodes included in the CRM Set 202 and the candidate set 204 (e.g., measurements indicating that a particular node is closer to a UE or has less interference as compared to other nodes), the eNB 206 may select one or more nodes for transmitting data to the UE. The eNB 206 can include the selected nodes for transmitting data to the UE in the CoMP Measurement Set 208.

The CoMP Measurement Set 208 can be a subset of the CRM Set 202 and/or the candidate set 204. For example, the CRM Set 202 and the candidate set 204 may be comprised of ten nodes. Based on the measurements (e.g., CSI-RS based RRM, CRS, SRS) of the ten nodes received from the UE, the eNB 206 may determine that two of the nodes may be ideal for engaging in CoMP (e.g., the two nodes may be closest to the UE). In other words, the UE may be performing CSI-RS based RRM measurements on the ten nodes. Thereafter, the eNB 206 may determine that two of the nodes may be ideal for transmitting data to the UE based on CSI-RS based RRM measurements reported by the UE. The two CSI-RS based RRM measurements may correspond with two nodes that are closer to the UE or have less interference in communicating with the UE. Thus, the two nodes can be included in the CoMP Measurement Set 208.

In general, the UE reports the CSI-RS based RRM measurements to the eNB 206 so that the eNB 206 can determine which CSI-RSs can be involved in CoMP. In other words, the UE performs measurements on a set of nearby cells or nodes and sends the measurements to a base station (i.e., the eNB). The eNB 206 determines which cells or nodes can be used for the actual transmission of data to the UE based on the received measurements. Thus, after receiving the measurements, the eNB 206 can initiate or terminate CoMP. In other words, the eNB 206 uses the measurements to perform scheduling and resource allocation (e.g., determining which nodes are to communicate with the UE).

The UE can periodically report the CSI-based RRM measurements to the eNB. Alternatively, the UE can communicate the CSI-based RRM measurements based upon the occurrence of an event, such as event A7 which triggers measurement reporting by the UE to the eNB. The CSI-RS based RRM measurements can be periodic or event-based measurements. In other words, the UE can periodically perform CSI-RS based RRM measurements and then report the measurements to the eNB. The UE can transmit reports with the CSI-RS based RRM measurements to the eNB upon a validity of a trigger (i.e., trigger-based reporting). The UE can perform the CSI-RS based RRM measurements upon an event occurring (e.g., event A7), and then periodically transmit the reports with the CSI-RS based RRM measurements to the eNB.

The UE can send fast channel state information (CSI) feedback to the eNB 206 for the nodes included in the CoMP Measurement Set 208. In other words, the CoMP Measurement Set 208 can be the set of CSI-RS measured nodes for which the UE provides actual CSI feedback to the eNB 206. For example, if the UE is measuring five nodes using CSI-RSs RRM measurements and the eNB 206 determines that two of the nodes are best for engaging in CoMP, the UE can then be instructed to provide fast CSI feedback for the two CSI-RS measured nodes to the eNB 206. Thus, the fast CSI feedback can differ from the RRM measurements performed by the UE. The fast CSI feedback for the nodes included in the CoMP Measurement Set 208 can be used, by the eNB 206 for scheduling resources. In addition, the fast CSI feedback can be periodic or aperiodic fast CSI feedback.

In one embodiment, the eNB 206 can reconfigure the nodes for which the UE sends fast CSI feedback back to the eNB 206. For example, the eNB 206 may determine that two nodes (i.e., eNB, LPN or RRH) out of a set of three nodes are measured to be best for sending data to the UE. However, as the UE changes position relative to the nodes, the link between the nodes and the UE may deteriorate. In other words, the increased distance between the two nodes and the UE may reduce the data transfer speed between the two nodes and the UE. Therefore, the eNB 206 may determine that additional nodes (e.g., the third node) can be used to communicate with the UE. The eNB 206 may determine the additional nodes based on the CSI-RS based RRM measurements that are sent from the UE on a periodic or triggered event. The CoMP Measurement Set 208 can be dynamically updated, at the eNB 206, to include the additional (i.e., the closest) nodes to the UE. After the CoMP Measurement Set 208 is updated, the eNB can send an information element (IE) to the UE containing a list of measurement objects. The list of measurement objects may include the nodes for which the UE is to send fast CSI feedback to the eNB 206. Thus, the UE sends fast CSI feedback to the eNB for the updated set of nodes in the CoMP Measurement Set 208.

Figure 3:
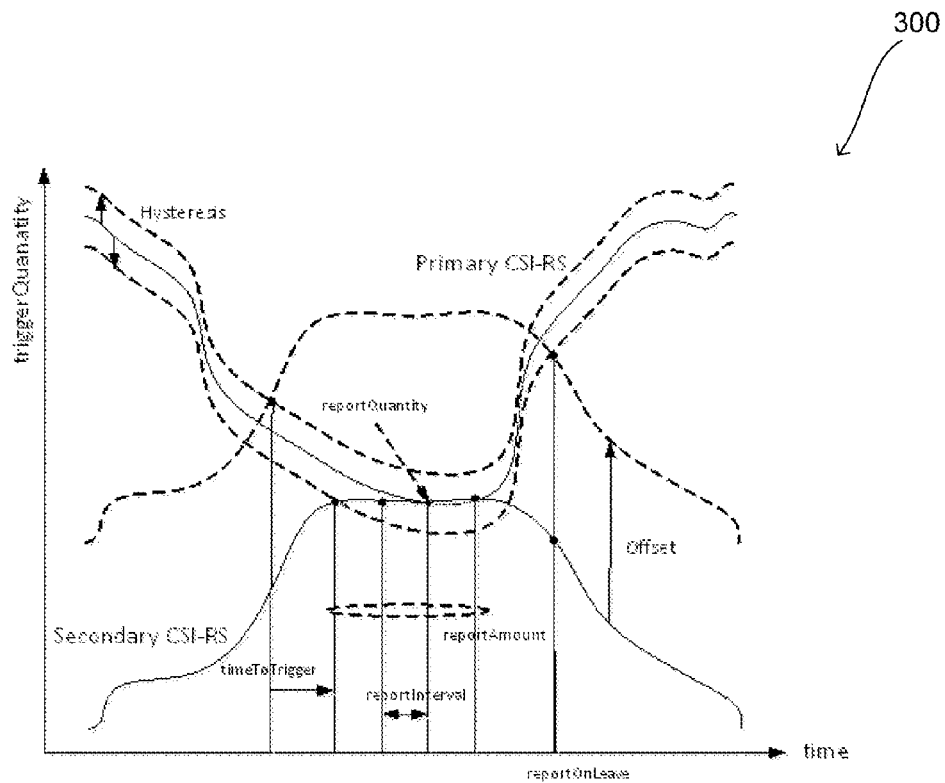
FIG. 3 is a graph that illustrates an A3 event performed by a user equipment (UE) relating to channel state information reference signal (CSI-RS) based radio resource management (RRM) measurements and reporting in accordance with an example.

FIG. 3 is a graph 300 that illustrates an A3 event relating to channel state information reference signal (CSI-RS) based radio resource management (RRM) measurements and reporting. In general, the A3 event can be a triggering event that occurs when a neighbor cell becomes an offset above the serving cell. Upon an occurrence of the A3 event, the UE can send a measurement report to the eNB. FIG. 3 shows a trigger quantity of a primary and secondary CSI-RS over time, and in particular, that the secondary CSI-RS has become an offset above the primary CSI-RS. The UE can report the CSI-RS based RRM measurements for the primary and secondary CSI-RSs to the eNB. The reporting mechanism (e.g., hysteresis, time to trigger, report interval, report amount, report quantity, etc.) are defined in conventional RRM mobility measurements and configured by CSI-RS reporting configurations.

In one embodiment, the UE can report CSI-RS based RRM measurements to the eNB after an occurrence of an A7 event. The A7 event that triggers the UE to report the CSI-RS based RRM measurements to the eNB can include a positive offset value for a primary CSI-RS based RRM measurement, or a negative offset value for a primary CSI-RS based RRM measurement that has the greatest amplitude in the CRM Set.

In one embodiment, the UE can determine that the entering condition of the A7 event is satisfied when $Mn+Ocn-Hys>Mp+Ocp+Off$. Furthermore, the UE can determine that the leaving condition of the event A7 is satisfied when $Mn+Ocn+Hys<Mp+Ocp+Off$. In other words, an entering condition results in the eNB receiving the CSI-RS based RRM measurements from the UE, and a leaving condition results in the eNB not receiving the CSI-RS based RRM measurements from the UE. $Mn$ is the measurement result of the CSI-RS and does not include offsets. $Ocn$ is the CSI-RS specific offset, and is set to zero if not configured for the CSI-RS. The CSI-RS specific offset is the CSI-RS Individual Offset, as defined within measObjectEUTRA and corresponding to the frequency of the CSI-RS. $Mp$ is the measurement result of a primary CSI-RS and does not include offsets. $Ocp$ is the CSI-RS specific offset of the primary CSI-RS (i.e., the CSI-RSIndividualOffset as defined within measObjectEUTRA and corresponding to the primary CSI-RS frequency), and is set to zero if not configured for the primary CSI-RS. $Hys$ is a hysteresis parameter of the event (i.e., the hysteresis parameter as defined within reportConfigEUTRA for the A7 event). $Off$ is an offset parameter of the A7 event (i.e., the a7-Offset parameter as defined within reportConfigEUTRA for the A7 event). $Mn$ and $Mp$ are expressed in decibel milliwatts (dBm) for RSRP, or in decibels (dB) for RSRQ. $Ocn$, $Ocp$, $Hys$, and $Off$ are expressed in dB.

Figure 4:
FIG. 4 is a table of parameters used to configure channel state information reference signal (CSI-RS) resources in a coordinated multipoint (CoMP) Resource Management (CRM) Set in accordance with an example.

FIG. 4 is a table 400 of parameters used to configure each channel state information reference signal (CSI-RS) resource in a coordinated multipoint (CoMP) Resource Management (CRM) Set. The CSI-RS resource can be associated with a node (i.e., a transmission point) included in the CRM Set that can be used for downlink transmissions to the UE. The content of the CRM set may depend on the configuration of the nodes (e.g., remote radio heads, eNB) in deployment of the CoMP system. The parameters used to configure the nodes may include AntennaPortsCount, ResourceConfig, SubframeConfig, and/or a scrambling initialization parameter. The AntennaPortsCount parameter can define the number of antenna ports 1 or 2. The ResourceConfig parameter can define the CSI-RS pattern within a subframe. The SubframeConfig parameter can define a subframe offset and periodicity of a CSI-RS transmission. The scrambling initialization parameter can be a seed for unitization of a CSI-RS modulation sequence. The CRM set can be configured using radio resource control (RRC) signaling as CSI-RS measurement objects similar to existing RRM measurement configurations. The reporting of the CSI-RS measurements and the CRS measurements may be defined independently, as the eNB may not inform the UE in the manner which the eNB uses the CSI-RS measurements.

Figure 5:
FIG. 5 is a table of parameters used to configure channel state information reference signal (CSI-RS) based radio resource management (RRM) measurements in accordance with an example.

FIG. 5 is a table 500 of parameters used to configure channel state information reference signal (CSI-RS) based radio resource management (RRM) measurements. The table 500 may include the configuration of reporting criterion and parameters. In addition, the CSI-RS reporting can be configured by a reporting mechanism (i.e., hysteresis, time to trigger, report interval, amount of reports, and report on leave). The reporting configuration parameters may include triggerType, eventId, a1-Threshold, a2-Threshold, a3-Offset, a4-Threshold, a5-Threshold1, a5-Threshold2, hysteresis, timeToTrigger, reportInterval, reportAmount, reportQuantity, triggerQuantity, threshold-RSRP, and threshold-RSRQ. The content of the report may include a measured quantity of a CSI-RS resource, an index of the CSI-RS resource in the CRM Set for which the CSI-RS based RRM measurement is provided, and a reference CSI-RS resource in the CRM Set. In one example, the reference CSI-RS resource index can be a primary CSI-RS resource. The primary CSI-RS resource can be the first configured CSI-RS resource in the CRM set. The primary CSI-RS resource can be the strongest CSI-RS resource in the CRM Set. The strongest CSI-RS resource can indicate that a particular node out of a plurality of nodes is the closest node to the UE, has a lowest level of interference, or a combination of these factors. In addition, the strongest CSI-RS resource can indicate that a particular node can transfer data to the UE at the highest data transfer rate. The UE can report the CSI-RS based RRM measurements to the eNB periodically or based on an event, as described in greater detail above.

The table 500 may include quantity configuration parameters for the configuration of layer 3 (L3) filtering parameters. The parameters may be related to the quantity the UE is measuring on the CSI-RS (e.g., the RSRP) and associated filtering. For layer 3 filtering, the parameters can be defined similar to conventional mobility RRM measurements. The parameters may be signaled as part of the quantity configuration. The parameters may include filter Coefficient RSRP and filter Coefficient RSRQ. In addition, the measurement identities may be used in a similar manner to other RRM measurements that link measurement objects and the configuration of reporting the RRM measurements.

In order to define the CSI-RS resources in the CRM Set as measurement objects, the measurement configuration may include parameters related to measurement objects, reporting configurations, measurement identities, and quantity configuration. The measurement objects can include parameters for configuring the CSI-RS resources. For example, the measurement object parameters may include a CSI-RS Index (or antennaPortsCount, resourceConfig, subframeConfig, csirs-Bandwidth). The reporting configurations for CSI-based RRM measurement reporting can be either periodic or event driven. In event driven reporting, triggers can be configured to control when a report is made from the UE to the eNB. The measurement identities can be used in a manner similar to other RRM measurements that link the measurement objects with their respective report configuration. The quantity configuration corresponds to a quantity the UE is measuring on the CSI-RS (e.g., RSRP). The quantity configuration can include associated filtering parameters. For example, the layer 3 filtering parameters can be defined in a manner similar to conventional mobility RRM measurements.

FIG. 6 illustrates an amended procedure 600 in the Third Generation Partnership Project (3GPP) Radio Resource Connection (RRC) Technical Specification (TS) 36.331 for the addition and modification of channel state information reference signal (CSI-RS) measurement objects. FIG. 6 shows changes made to section 5.5.2.5 of 3GPP TS 36.331 Rel. 10.

In 3GPP Releases 8, 9, and 10, the measurement objects include CRS-based measurement objects in which frequencies in cells are measured. By extending the measurement objects to include the CSI-RS measurement object, the eNB may receive one or more CSI-RS based measurements from a plurality of nodes used in a CoMP system. The plurality of nodes may be included in a cell. Thus, the eNB may identify the nodes within the cell to send information to the UE, even though the nodes can have the same cell ID in CoMP scenario four.

In general, the UE can measure objects, and then report the measurements to the eNB. For example, the objects can include a set of CSI-RSs configured for the UE. The UE can perform CSI-RS based RRM measurements for the set of CSI-RSs, and then report the CSI-RS based RRM measurements to the eNB. The Evolved Universal Terrestrial Radio Access Network (E-UTRAN) can govern the objects that are to be measured by the UE. The E-UTRAN may govern the addition, modification, and/or removal of measurement objects (e.g., CSI-RS resources) for which the UE should measure. Thus, an eNB included in the E-UTRAN can send an information element (IE) to the UE, wherein the IE contains an updated list of measurement objects for the UE to measure. For example, MeasObjectToAddModList can be an IE with a list of measurement objects to add or modify.

According to the amended procedure 600, the received measObject (e.g., the measurement objects contained in the IE) can include the csi-RS-ToRemoveList. For each csi-RS-Index included in the csi-RS-ToRemoveList, the UE can remove the entry with the matching CSI-RSIndex from the csi-RS-ToAddModList. In addition, the received measObject can include the csi-RS-ToAddModList. The csi-RS-ToAddModList can include csi-RS-Index values. If an entry with the matching csi-RS-Index exists in the csi-RS-ToAddModList, then the UE can replace the entry with the value received from this csi-RS-Index. Otherwise, the UE can add a new entry for the received csi-RS-Index to the csi-RS-ToAddModList.

Figure 7:
FIG. 7 is a table providing descriptions of measurement objects used for enabling the addition and modification of channel state information reference signal (CSI-RS) measurement objects in accordance with an example.

FIG. 7 is a table 700 of descriptions of fields included in the measurement object EUTRA (i.e., MeasObjectEUTRA). The fields in MeasObjectEUTRA can be included in the amended procedure to 3GPP RRC Technical Specification (TS) 36.331. In addition, MeasObjectEUTRA can be included in various ASN.1 code examples that are used for enabling the addition and modification of channel state information reference signal (CSI-RS) measurement objects. The CSI-RSIndex parameter is an entry index in the CSI-RS list. The entry may concern a range of CSI-RSs, in which case the CSI-RSIndex value applies to the entire range of CSI-RSs. The CSI-RSIndividualOffset parameter is a CSI-RS individual offset that is applicable to a specific CSI-RS. The CSI-RSIndividualOffset value of dB-24 may correspond to −24 dB, and the CSI-RSIndividualOffset value of dB-22 may correspond to −22 dB, and so on. The csi-RS-ToAddModList field is a list of CSI-RSs to add and/or modify in the cell list. The cell list can be a list of nodes for transmitting data to the UE. The csi-RS-ToRemoveList field is a list of CSI-RSs to remove from the cell list. The measCycleSCell field is used when an SCell is configured on the frequency indicated by the measObject and is in a deactivated state. In addition, the measCycleSCell field may also be signaled when an SCell is not configured. A measCycleSCell value of sf160 corresponds to 160 sub-frames, a measCyclesCell value of sf256 corresponds to 256 sub-frames, and so on. The parameter $T_{measure\_scc}$ is further defined in section 8.3.3 of 3GPP TS 36.133 Rel. 10.

FIGS. 8A-8D illustrate ASN.1 code examples 810, 820, 830 and 840 that enable the addition and modification of channel state information reference signal (CSI-RS) measurement objects as provided by an evolved universal terrestrial radio access network (E-UTRAN). For example, FIG. 8A shows example ASN.1 code 810 with measObject-EUTRA-CSI-RS being added to the MeasObjectToAddModList. In FIG. 8B, the ASN.1 code 820 includes the MeasObjectEUTRA-CSI-RS. In FIG. 8C, the ASN.1 code 830 includes the CSI-RS-ToAddModList fields. The ASN.1 code 830 includes the parameters of csi-RS-Index, antennaPortsCount, resourceConfig, subframeConfig, and ScramblingInitializationParameter. The allowedMeasBandwidth parameter can be omitted or replaced with a system bandwidth. FIG. 8D shows an additional implementation of ASN.1 code 840 for adding CSI-RS related information within measObjectEUTRA. The ASN.1 code 840 includes the csi-RS-ToRemoveList, CellIndexList, and csi-RS-ToAddModList values. In general, the CSI-RS-ToAdd Mod List can be included in the IE that is sent from the eNB to the UE, and includes a list of added and/or modified measurement objects. The csi-RS-Bandwidth may be omitted if all of the CSI-RSs have the same bandwidth as indicated by the allowedMeasBandwidth parameter.

Figure 9:
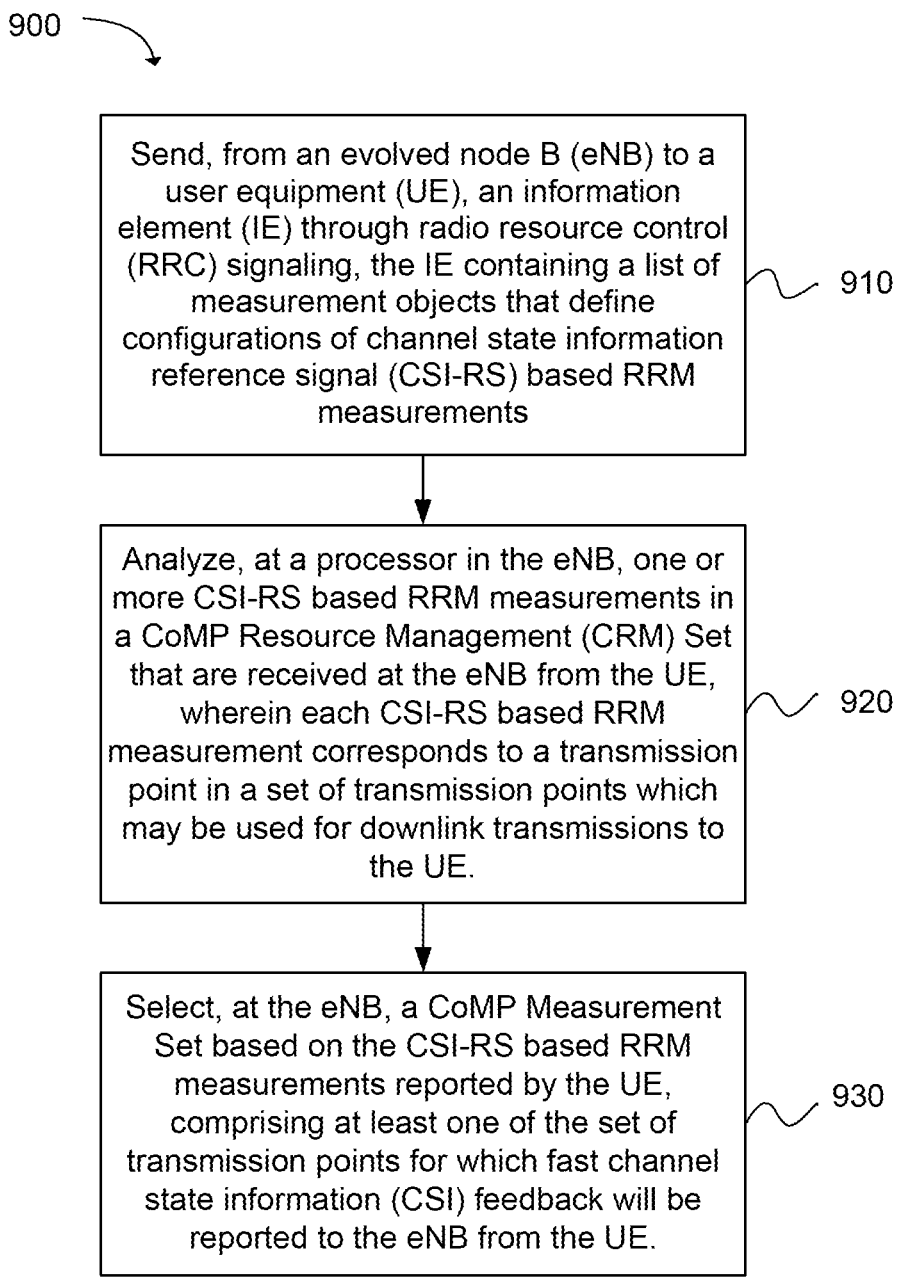
FIG. 9 depicts a flow chart of a method for enabling radio resource management (RRM) measurements in coordinated multi-point (CoMP) transmission and reception in accordance with an example.

FIG. 9 depicts a flow chart of a method 900 for enabling radio resource management (RRM) measurements in coordinated multi-point (CoMP) transmission and reception) in accordance with an embodiment of the present invention. The method includes the operation of sending 910, from an evolved node B (eNB) to a user equipment (UE), an information element (IE) through radio resource control (RRC) signaling, the IE containing a list of measurement objects that define configurations of channel state information reference signal (CSI-RS) based RRM measurements. The method 900 further comprises analyzing 920, at a processor in the eNB, one or more CSI-RS based RRM measurements in a CoMP Resource Management (CRM) Set that are received at the eNB from the UE, wherein each CSI-RS based RRM measurement corresponds to a transmission point in a set of transmission points which may be used for downlink transmissions to the UE. The method 900 can further comprise selecting 930, at the eNB, a CoMP Measurement Set based on the CSI-RS based RRM measurements reported by the UE, comprising at least one of the set of transmission points for which fast channel state information (CSI) feedback will be reported to the eNB from the UE.

In one embodiment, the operation of selecting, at the eNB, the CoMP Measurement Set in the method 900 can include using additional measurements that correspond to the set of transmission points to determine the CoMP Measurement Set, the additional measurements including at least one of: cell-specific reference signal (CRS) based RRM measurements, sounding reference signal (SRS) measurements periodically received from the UE, and physical uplink control channel (PUCCH) measurements periodically received from the UE.

The method 900 can also include sending, from the eNB to the UE, an IE through RRC signaling containing configuration information to add, remove, or replace CSI-RS resources for which the UE should measure the CSI-RS based RRM measurements. The method 900 can also include receiving, at the eNB from the UE, CSI-RS based RRM measurements corresponding to the set of transmission points based on at least one of the following: receiving the CSI-RS based RRM measurements when an event triggers the CSI-RS based RRM measurements to be reported by the UE, receiving the CSI-RS based RRM measurements periodically reported by the UE, and receiving the CSI-RS based RRM measurements periodically reported by the UE when an event triggers the CSI-RS based RRM measurements to be periodically reported by the UE.

The method 900 can also include receiving the CSI-RS based RRM measurements, at the eNB from the UE, wherein the event comprises: an entering condition of $Mn+Ocn-Hys>Mp+Ocp+Off$ to receive the CSI-RS based RRM measurements from the UE, and a leaving condition of $Mn+Ocn+Hys<Mp+Ocp+Off$ to not receive the CSI-RS based RRM measurements from the UE, wherein Mn is the measurement result of the CSI-RS, Ocn is the CSI-RS specific offset, Mp is the measurement result of a primary CSI-RS, Ocp is the CSI-RS specific offset of the primary CSI-RS, Hys is a hysteresis parameter of the event, and Off is an offset parameter of the event.

The method 900 can also include defining measurement configuration for CSI-RS resources in the CRM Set defining at least one of the following parameters: measurement objects, reporting configurations, measurement identities, and quantity configurations. In one embodiment, the CRM set in the method 900 includes a channel state information reference signal (CSI-RS) corresponding to the transmission point, the transmission point including a remote radio head (RRH) that is associated with the eNB, wherein the RRH has a same cell identifier (ID) as the eNB in CoMP scenario four.

The method 900 can also include dynamically updating the CoMP Measurement Set, at the eNB, to include different transmission points based on the CSI-RS based RRM measurements that are received from the UE. In one embodiment, the CSI-RS based RRM measurements in the method 900 include at least one of: reference signal received power (RSRP) measurements, and reference signal received quality (RSRQ) measurements.

In some embodiments, the present disclosure can include a user equipment (UE) enabled to perform channel state information reference signal (CSI-RS) based radio resource management (RRM) measurements in coordinated multi-point (CoMP) transmission and reception. The UE can have circuitry configured to: receive an information element (IE) through radio resource control (RRC) signaling, at the UE from the eNB, wherein the IE contains a list of measurement objects that define configurations of CSI-RS based RRM measurements; perform CSI-RS based RRM measurements, at the UE, for a set of nodes associated with the list of measurement objects in the IE; and transmit the CSI-RS based RRM measurements, from the UE to an evolved node B (eNB), for the set of nodes, wherein the set of nodes are included in a CoMP Resource Management (CRM) Set.

In one embodiment, the circuitry of the UE can be configured to: receive, at the UE from the eNB, a CoMP Measurement Set based on the CSI-RS based RRM measurements reported by the UE, wherein the CoMP Measurement Set includes at least one of the set of nodes; and transmit, to the eNB, fast channel state information (CSI) feedback information for the nodes included in the CoMP Measurement Set. In one embodiment, the circuitry of the UE can be configured to receive, at the UE from the eNB, an IE through RRC signaling containing configuration information to add, remove, or replace CSI-RS resources for which the UE should measure the CSI-RS based RRM measurements.

In one embodiment, the circuitry of the UE can be configured to report, to the eNB, a measured quantity of a CSI-RS resource, an index of the CSI-RS resource in the CRM Set for which the CSI-RS based RRM measurement is provided, and a reference CSI-RS resource in the CRM Set. In some embodiments, the circuitry of the UE can be configured to periodically report the CSI-RS based RRM measurements, by the UE to the eNB, for the nodes included in the CoMP Measurement Set. In addition, the circuitry of the UE can be configured to report the CSI-RS based RRM measurements for the nodes included in the CoMP Measurement Set when an event triggers the CSI-RS based RRM measurements to be reported by the UE to the eNB. In some embodiments, the event that triggers the UE to report the CSI-RS based RRM measurements to the eNB includes at least one of: a positive offset value for a primary CSI-RS based RRM measurement; and a negative offset value for a primary CSI-RS based RRM measurement that has a greatest amplitude in the CRM Set.

In one embodiment, the circuitry of the UE can be configured to report the CSI-RS based RRM measurements to the eNB, wherein the event comprises: an entering condition of $Mn+Ocn-Hys>Mp+Ocp+Off$ to receive the CSI-RS based RRM measurements from the UE; and a leaving condition of $Mn+Ocn+Hys<Mp+Ocp+Off$ to not receive the CSI-RS based RRM measurements from the UE, wherein Mn is the measurement result of the CSI-RS, Ocn is the CSI-RS specific offset, Mp is the measurement result of a primary CSI-RS, Ocp is the CSI-RS specific offset of the primary CSI-RS, Hys is a hysteresis parameter of the event, and Off is an offset parameter of the event.

In some embodiments, the present disclosure can include at least one computer readable medium having instructions stored thereon for enabling radio resource management (RRM) measurements for coordinated multi-point (CoMP) transmission and reception, the instructions when executed on a machine cause the machine to: send, from an evolved node B (eNB) to a user equipment (UE), an information element (IE) through radio resource control (RRC) signaling, the IE containing a list of measurement objects that define configurations of channel state information reference signal (CSI-RS) based RRM measurements; receive, at the eNB, one or more CSI-RS based RRM measurements reported by the UE and in accordance with the list of measurement objects included in the IE sent to the UE, wherein the one or more CSI-RS based RRM measurements are included in a CoMP Resource Management (CRM) Set and correspond with a set of transmission points used for performing downlink transmissions to the UE; and determine, at the eNB, a CoMP Measurement Set based on the CSI-RS based RRM measurements reported by the UE, comprising at least one of the set of transmission points for which fast channel state information (CSI) feedback will be reported to the eNB from the UE.

In one embodiment, the computer readable medium can be configured to use additional measurements corresponding to the set of transmission points to determine the CoMP Measurement Set, the additional measurements including at least one of: cell-specific reference signal (CRS) based RRM measurements; sounding reference signal (SRS) measurements periodically received from the UE; and physical uplink control channel (PUCCH) measurements periodically received from the UE.

In one embodiment, the computer readable medium can be configured to send, from the eNB to the UE, an IE through RRC signaling containing configuration information to add, remove, or replace CSI-RS resources for which the UE should measure the CSI-RS based RRM measurements. In some examples, the computer readable medium can be configured to receive, at the eNB from the UE, CSI-RS based RRM measurements corresponding to the set of transmission points when an event triggers the CSI-RS based RRM measurements to be reported to the eNB.

In one embodiment, the computer readable medium can be configured to receive, at the eNB from the UE, periodic CSI-RS based RRM measurements corresponding to the set of transmission points when an event triggers the CSI-RS based RRM measurements to be periodically reported to the eNB. In some examples, the event comprises: an entering condition of $Mn+Ocn-Hys>Mp+Ocp+Off$ to receive the CSI-RS based RRM measurements from the UE; and a leaving condition of Mn+Ocn+Hys<Mp+Ocp+Off to not receive the CSI-RS based RRM measurements from the UE, wherein Mn is the measurement result of the CSI-RS, Ocn is the CSI-RS specific offset, Mp is the measurement result of a primary CSI-RS, Ocp is the CSI-RS specific offset of the primary CSI-RS, Hys is a hysteresis parameter of the event, and Off is an offset parameter of the event.

Figure 10:
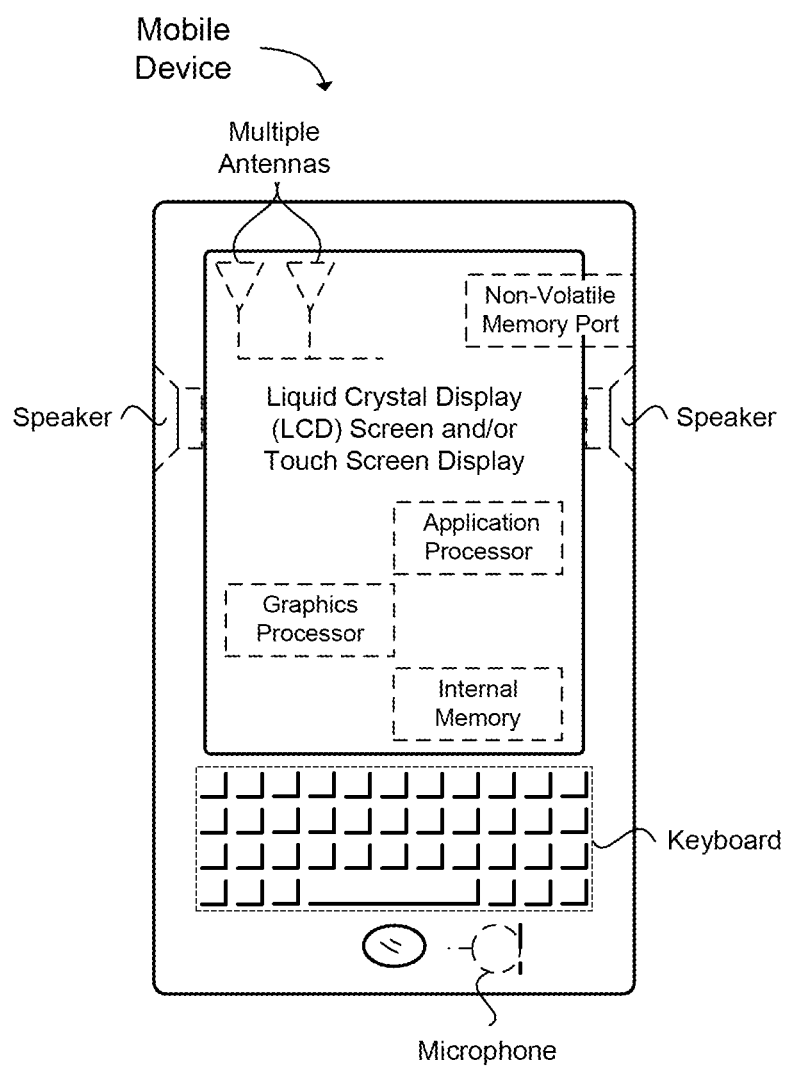
FIG. 10 illustrates a diagram of a wireless device in accordance with an example.

FIG. 10 provides an example illustration of the wireless device, such as a user equipment (UE), a mobile station (MS), a mobile wireless device, a mobile communication device, a tablet, a handset, or other type of mobile wireless device. The wireless device can include one or more antennas configured to communicate with a node, such as a macro node, a low power node (LPN) or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 10 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for enabling radio resource management (RRM) measurements for coordinated multi-point (CoMP) transmission and reception, the method comprising:
    sending, from an evolved node B (eNB) to a user equipment (UE), an information element (IE) through radio resource control (RRC) signaling, the IE containing a list of measurement objects that define configurations of channel state information reference signal (CSI-RS) based RRM measurements;
    analyzing, at a processor in the eNB, one or more CSI-RS based RRM measurements in a CoMP Resource Management (CRM) Set that are received at the eNB from the UE, wherein each CSI-RS based RRM measurement corresponds to a transmission point used for performing downlink transmissions to the UE; and
    selecting, at the eNB, a CoMP Measurement Set based on the CSI-RS based RRM measurements reported by the UE and at least one of:
    sounding reference signal (SRS) measurements periodically received from the UE or
    physical uplink control channel (PUCCH) measurements periodically received from the UE,
wherein the CoMP measurement set comprises at least one of the set of transmission points for which fast channel state information (CSI) feedback will be reported to the eNB from the UE.

2. The method of claim 1, wherein selecting, at the eNB, the CoMP Measurement Set, further comprises using additional measurements that correspond to the set of transmission points to determine the CoMP Measurement Set, the additional measurements including
    cell-specific reference signal (CRS) based RRM measurements.

3. The method of claim 1, further comprising sending, from the eNB to the UE, an IE through RRC signaling containing configuration information to add, remove, or replace CSI-RS resources for which the UE should measure the CSI-RS based RRM measurements.

4. The method of claim 1, further comprising receiving, at the eNB from the UE, CSI-RS based RRM measurements corresponding to the set of transmission points based on at least one of the following:
    receiving the CSI-RS based RRM measurements when an event triggers the CSI-RS based RRM measurements to be reported by the UE;
    receiving the CSI-RS based RRM measurements periodically reported by the UE; and
    receiving the CSI-RS based RRM measurements periodically reported by the UE when an event triggers the CSI-RS based RRM measurements to be periodically reported by the UE.

5. The method of claim 4, further comprising receiving the CSI-RS based RRM measurements, at the eNB from the UE, wherein the event comprises:
    an entering condition of Mn+Ocn−Hys>Mp+Ocp+Off to receive the CSI-RS based RRM measurements from the UE; and
    a leaving condition of Mn+Ocn+Hys<Mp+Ocp+Off to not receive the CSI-RS based RRM measurements from the UE,
    wherein Mn is the measurement result of the CSI-RS, Ocn is the CSI-RS specific offset, Mp is the measurement result of a primary CSI-RS, Ocp is the CSI-RS specific offset of the primary CSI-RS, Hys is a hysteresis parameter of the event, and Off is an offset parameter of the event.

6. The method of claim 1, further comprising defining measurement configuration for CSI-RS resources in the CRM Set defining at least one of the following parameters: measurement objects, reporting configurations, measurement identities, and quantity configurations.

7. The method of claim 1, wherein the CRM set comprises a channel state information reference signal (CSI-RS) corresponding to the transmission point, the transmission point including a remote radio head (RRH) that is associated with the eNB, wherein the RRH has a same cell identifier (ID) as the eNB when CoMP scenario four is used.

8. The method of claim 1, further comprising dynamically updating the CoMP Measurement Set, at the eNB, to include different transmission points based on the CSI-RS based RRM measurements that are received from the UE.

9. The method of claim 1, wherein the CSI-RS based RRM measurements include at least one of: reference signal received power (RSRP) measurements; and reference signal received quality (RSRQ) measurements.

10. A user equipment (UE) enabled to perform channel state information reference signal (CSI-RS) based radio resource management (RRM) measurements in coordinated multi-point (COMP) transmission and reception, the UE having circuitry configured to:
    receive an information element (IE) through radio resource control (RRC) signaling, at the UE from the eNB, wherein the IE contains a list of measurement objects that define configurations of CSI-RS based RRM measurements;
    perform CSI-RS based RRM measurements, at the UE, for a set of nodes associated with the list of measurement objects in the IE;
    report a CoMP measurement set comprising a CSI-RS based RRM measurement reported from the UE and at least one of:
        sounding reference signal (SRS) measurements periodically received from the UE or
        physical uplink control channel (PUCCH) measurements periodically received from the UE; and
    transmit the CSI-RS based RRM measurements, from the UE to an evolved node B (eNB), for the set of nodes, wherein the set of nodes are included in a CoMP Resource Management (CRM) Set.

11. The UE of claim 10, wherein the circuitry is further configured to:
    receive, at the UE from the eNB, a CoMP Measurement Set based on the CSI-RS based RRM measurements reported by the UE, wherein the CoMP Measurement Set includes at least one of the set of nodes; and
    transmit, to the eNB, fast channel state information (CSI) feedback information for the nodes included in the CoMP Measurement Set.

12. The UE of claim 11, wherein the circuitry is further configured to receive, at the UE from the eNB, an IE through RRC signaling containing configuration information to add, remove, or replace CSI-RS resources for which the UE should measure the CSI-RS based RRM measurements.

13. The UE of claim 10, wherein the circuitry is further configured to report, to the eNB, a measured quantity of a CSI-RS resource, an index of the CSI-RS resource in the CRM Set for which the CSI-RS based RRM measurement is provided, and a reference CSI-RS resource in the CRM Set.

14. The UE of claim 10, wherein the circuitry is further configured to periodically report the CSI-RS based RRM measurements, by the UE to the eNB, for the nodes included in the CoMP Measurement Set.

15. The UE of claim 10, wherein the circuitry is further configured to report the CSI-RS based RRM measurements for the nodes included in the CoMP Measurement Set when an event triggers the CSI-RS based RRM measurements to be reported by the UE to the eNB.

16. The UE of claim 15, wherein the event that triggers the UE to report the CSI-RS based RRM measurements to the eNB includes at least one of:
a positive offset value for a primary CSI-RS based RRM measurement;
and a negative offset value for a primary CSI-RS based RRM measurement that has a greatest amplitude in the CRM Set.

17. The UE of claim 15, wherein the circuitry is further configured to report the CSI-RS based RRM measurements to the eNB, wherein the event comprises:
an entering condition of $Mn+Ocn-Hys>Mp+Ocp+Off$ to receive the CSI-RS based RRM measurements from the UE; and
a leaving condition of $Mn+Ocn+Hys<Mp+Ocp+Off$ to not receive the CSI-RS based RRM measurements from the UE,
wherein Mn is the measurement result of the CSI-RS, Ocn is the CSI-RS specific offset, Mp is the measurement result of a primary CSI-RS, Ocp is the CSI-RS specific offset of the primary CSI-RS, Hys is a hysteresis parameter of the event, and Off is an offset parameter of the event.

18. At least one non-transitory computer readable medium having instructions stored thereon for enabling radio resource management (RRM) measurements for coordinated multi-point (CoMP) transmission and reception, the instructions when executed on a machine cause the machine to:
send, from an evolved node B (eNB) to a user equipment (UE), an information element (IE) through radio resource control (RRC) signaling, the IE containing a list of measurement objects that define configurations of channel state information reference signal (CSI-RS) based RRM measurements;
receive, at the eNB, one or more CSI-RS based RRM measurements reported by the UE and in accordance with the list of measurement objects included in the IE sent to the UE, wherein the one or more CSI-RS based RRM measurements are included in a CoMP Resource Management (CRM) Set and correspond with a set of transmission points used for performing downlink transmissions to the UE; and
determine, at the eNB, a CoMP Measurement Set based on the CSI-RS based RRM measurements reported by the UE and at least one of:
sounding reference signal (SRS) measurements periodically received from the UE or
physical uplink control channel (PUCCH) measurements periodically received from the UE,
wherein the CoMP measurement set comprises at least one of the set of transmission points for which fast channel state information (CSI) feedback will be reported to the eNB from the UE.

19. The computer readable medium of claim 18, further configured to use additional measurements corresponding to the set of transmission points to determine the CoMP Measurement Set, the additional measurements including
cell-specific reference signal (CRS) based RRM measurements.

20. The computer readable medium of claim 18, further configured to send, from the eNB to the UE, an IE through RRC signaling containing configuration information to add, remove, or replace CSI-RS resources for which the UE should measure the CSI-RS based RRM measurements.

21. The computer readable medium of claim 18, further configured to receive, at the eNB from the UE, CSI-RS based RRM measurements corresponding to the set of transmission points when an event triggers the CSI-RS based RRM measurements to be reported to the eNB.

* * * * *